July 8, 1958 A. J. MOORADIAN 2,842,224
DE-ENTRAINMENT COLUMN
Filed July 25, 1955

INVENTOR.
Ara J. Mooradian
BY Alex. E. MacRae
Attorney.

United States Patent Office 2,842,224
Patented July 8, 1958

2,842,224
DE-ENTRAINMENT COLUMN

Ara J. Mooradian, Deep River, Ontario, Canada, assignor, by mesne assignments, to the United States of America as represented by the United States Atomic Energy Commission Application July 25, 1955, Serial No. 524,127

1 Claim. (Cl. 183—34)

This invention relates to de-entrainment or dephlegmation columns.

Columns of this type are used in distillation processes for various purposes. They are, for instance, employed in distillation processes for removing contaminating products from waste solutions resulting from the processing of radioactive materials and the like. It is frequently necessary to treat such waste solutions to bring the decontamination factor thereof to at least $10^6$, i. e., to a point where the contamination product is present therein in an amount not exceeding 1 to 1,000,000 parts. The decontamination factor which may be realized in normal distillation processes utilizing conventional packed columns varies between $10^3$ and $10^5$. Thus, refluxing is required to realize the required factor. Moreover, such conventional packed columns are of considerable height, and incidental housing and shielding costs are therefore high.

It is an object of the present invention to provide a de-entrainment column for use in distillation processes wherein required de-entrainment of substances in a vapour is effected to a much improved degree in a single distillation stage without reflux. Another object is to provide a de-entrainment column of greatly reduced height whereby a considerable saving in space and incidental construction costs is effected.

The invention contemplates the provision of a de-entrainment column comprising a hollow body having a passage extending axially therethrough, a sintered plate transversely mounted in said body and extending completely across said passage, one end of said passage constituting a vapour inlet, and means in said passage between said inlet and said plate to prevent splashing of liquid on said plate.

Figures 1, 3:
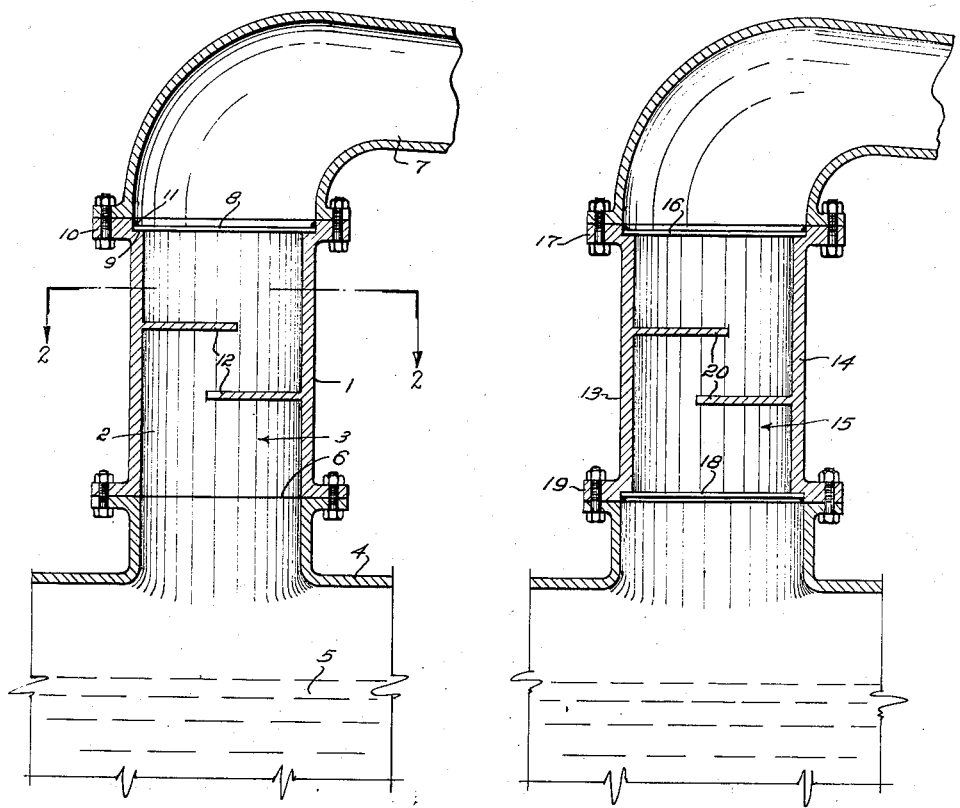
Figure 2:
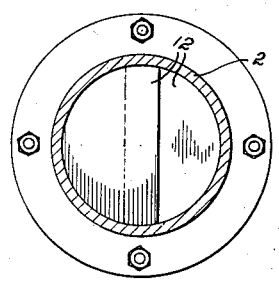

The invention will be described with particular reference to the accompanying drawing in which:

Figure 1 is a sectional elevation of a de-entrainment column in accordance with the invention associated with distillation apparatus, Figure 2 is a plan view of the de-entrainment column, and Figure 3 is a sectional elevation of a modified form of column.

Referring to Figures 1 and 2, 1 is a column in accordance with the invention comprising a hollow body 2 having an axial vapour passage 3. As shown, the body 2 is of cylindrical form but it may be of any suitable shape. The column is shown as mounted in a distillation apparatus including a vessel 4 containing a solution 5 to be vaporized by application of heat in any suitable manner. The column is mounted upon the neck of the vessel with the lower end of passage 3, constituting a vapour inlet 6, in communication with the interior of the vessel. A bent neck portion 7 of the distillation apparatus is mounted on the upper end of body 2, the adjacent end of passage 3 constituting a vapour outlet communicating with the neck 7.

A sintered plate 8 is mounted transversely in the body 2 and, as shown, is seated upon an annular shoulder 9 in the top flange 10 of the body and secured therein as by welding 11. However, any suitable means may be employed for mounting the plate 8 in the body in such manner that it extends completely across the passage 3. The plate 8 may be formed of stainless steel, glass, synthetic resins, and the like. The porosity of the plate may vary within wide limits. The thickness of the plate may vary but need not exceed ¼ inch and may be as small as ⅛ inch.

Means are provided in body 2 to prevent splashing of liquid upon the plate 8 and thus permit it to function properly. As shown, such means comprises a pair of spaced overlapping baffle plates 12, which prevent such splashing while permitting free passage of vapour. Any other conventional means may be provided for this purpose. For instance, the column below the plate 8 may be packed with Raschig rings, saddles or the like.

While a column with one plate 8 will function satisfactorily to achieve desired results, its efficiency may be increased by employing a plurality of sintered plates therein.

As illustrated in Figure 3, a column 13 comprising a cylindrical or like body 14 having an axial vapour passage 15 is employed. The body has a sintered plate or disc 16 mounted in the upper end flange 17 thereof, as well as a second sintered plate or disc 18 mounted in the lower end flange 19. Anti-splash overlapping baffles 20 are mounted intermediate the plates 16 and 18.

Use of a column as described has been found to produce greatly improved results as compared with conventional columns. For instance, in a decontaminating process, a decontamination factor of $10^6$ has been obtained without reflux, whereas in a conventional column the maximum decontamination factor obtainable, under the same conditions, is $10^5$.

Moreover, the overall height of the column need not exceed 12 inches, and may be as low as 6 inches, as compared with a conventional column height of 34 inches.

The function of the column described in achieving the improved results is based upon the fact that moisture particles impinge and coalesce on a moist surface much more readily than on a dry surface so that entrainment is considerably reduced by passage through a sintered plate or disc as described. In other words, condensation of a vapour is facilitated by adsorption on a surface as provided by the sintered plate. It is believed that the saturated vapour leaving the distillation vessel condenses on passage through the sintered plate and is re-evaporated on the other side of the plate under a slightly lower pressure. Thus, a multistage distillation is effected in which the energy for reevaporation is supplied by the vapour condensing on the other side of the plate, i. e., the liquid condensed in the plate acts as an evaporator wall.

The following tables give the results of a series of tests carried out in respect to decontamination treatment of waste solutions for the purpose of comparing the performance of the following two columns:

(1) Conventional packed column:
  Diameter—3½"
  Height—34"
  Packing—½" Raschig rings
(2) Column as illustrated in Figure 2:
  Diameter—3½"
  Height—12"
  Packing—None, but anti-splash baffles employed
  Plates—16 and 18 stainless steel

| Steam Pressure, p.s.i.g. | | Receiver Pressure, In. of Hg | | Pressure Drop Across Column of— | | | |
|---|---|---|---|---|---|---|---|
| | | | | Top Plate, In. of Hg | | Bottom Plate, In. of Hg | |
| (1) Packed Column | (2) Plate Column | (1) Packed Column | (2) Plate Column | (1) Packed | (2) Plate | (1) Packed | (2) Plate |
| 12.5 | 12.5 | ---- | ---- | ---- | 1.5 | ---- | 1.3 |
| 15.0 | 15.0 | ---- | ---- | ---- | 3.0 | ---- | 1.5 |
| 17.5 | 17.5 | ---- | ---- | ---- | 2.8 | ---- | 1.5 |
| 5.0 | 5.0 | −5.0 | −5.0 | 0.5 | 0.1 | ---- | 2.0 |
| ---- | 7.5 | ---- | −5.0 | ---- | 0.1 | ---- | 3.0 |
| 10.0 | 10.0 | −5.0 | −5.0 | 0.5 | 0.6 | ---- | 3.4 |

| Distillate Rate, Gal. Per Hr. | | Decontamination Factor | |
|---|---|---|---|
| (1) Packed | (2) Plate | (1) | (2) |
| 3.34 | 4.32 | $0.54 \times 10^4$ | $2.2 \times 10^6$ |
| 4.11 | 3.42 | $12.65 \times 10^4$ | $2.1 \times 10^6$ |
| 4.36 | 5.34 | $0.23 \times 10^4$ | $3.6 \times 10^6$ |
| 2.41 | 1.77 | $6.8 \times 10^4$ | $5.7 \times 10^6$ |
| ---- | 2.97 | ---------- | $3.3 \times 10^6$ |
| 3.84 | 3.24 | $3.86 \times 10^4$ | $7.0 \times 10^6$ |

What I claim is:

A de-entrainment column for removing substances from a stream of vapor coming from a distillation apparatus which comprises a vertically disposed hollow cylindrical body having a vapor passage extending upwardly therethrough, a sintered metal disc through which all vapor passes transversely mounted in said body and extending completely across said passage at its lower side, another sintered metal disc through which all vapor passes transversely mounted in said body and extending completely across said passage at its upper side, said sintered metal discs having a thickness of not more than ¼ inch, and a pair of spaced semi-circular overlapping baffle plates mounted in said passage between said sintered metal discs, each of said baffle plates extending transversely into and but partially across said passage.

References Cited in the file of this patent

UNITED STATES PATENTS

| | | |
|---|---|---|
| 607,441 | Kohe | July 19, 1898 |
| 1,087,907 | Publicker | Feb. 17, 1914 |
| 1,306,421 | Feltz | June 10, 1919 |
| 1,778,078 | Kinney | Oct. 14, 1930 |
| 2,126,236 | Westin | Aug. 9, 1938 |
| 2,220,641 | Davis | Nov. 5, 1940 |
| 2,238,174 | Kelm | Apr. 15, 1941 |
| 2,368,263 | Schneible | Jan. 30, 1945 |
| 2,458,909 | John | Jan. 11, 1949 |
| 2,515,155 | Munday | July 11, 1950 |
| 2,745,513 | Massey | May 15, 1956 |

FOREIGN PATENTS

| | | |
|---|---|---|
| 48,599 | Austria | June 26, 1911 |